Feb. 24, 1970  C. JONES  3,496,916
SEAL CONTROL STRUCTURE FOR ROTARY MECHANISMS
Filed March 8, 1968  4 Sheets-Sheet 1

INVENTOR.
CHARLES JONES
BY Raymond P. Wallace
AGENT

Feb. 24, 1970  C. JONES  3,496,916
SEAL CONTROL STRUCTURE FOR ROTARY MECHANISMS
Filed March 8, 1968  4 Sheets-Sheet 3

INVENTOR.
CHARLES JONES
BY Raymond P. Wallace
AGENT

Feb. 24, 1970 C. JONES 3,496,916
SEAL CONTROL STRUCTURE FOR ROTARY MECHANISMS
Filed March 8, 1968 4 Sheets-Sheet 4

INVENTOR.
CHARLES JONES
BY Raymond P. Wallace

AGENT

United States Patent Office 3,496,916
Patented Feb. 24, 1970

3,496,916
SEAL CONTROL STRUCTURE FOR ROTARY MECHANISMS
Charles Jones, Hillsdale, N.J., assignor to Curtiss-Wright Corporation, a corporation of Delaware
Filed Mar. 8, 1968, Ser. No. 711,784
Int. Cl. F02b 53/00, 55/02; F04c 17/02
U.S. Cl. 123—8                                10 Claims

ABSTRACT OF THE DISCLOSURE

In a rotary mechanism of the type described, the contact pressure of the apex seals against portions of the housing normally increases at high engine speeds owing to centrifugal effects, causing wear and power loss through friction. This invention provides a device responsive to centrifugal and frictional effects which retracts the seal at high speeds to diminish contact pressure.

BACKGROUND OF THE INVENTION

This invention relates to rotary mechanisms and is particularly directed to a seal structure for such mechanisms.

Such a rotary mechanism comprises a hollow outer body having spaced end walls interconnected by a peripheral wall to form a cavity therebetween and having an axis along which the end walls are spaced. The inner surface of the peripheral wall defines a multi-lobed profile which, in the form of mechanism described, is basically an epitrochoid. An inner body or rotor is supported for relative rotation within the outer body cavity. The rotor has an axis which is parallel to but laterally spaced from the outer body axis and has end faces disposed adjacent to and in sealing cooperation with the end walls. The outer peripheral surface of the rotor has a plurality of apex portions in sealing cooperation with the adjacent inner surface of the peripheral wall forming a plurality of working chambers therebetween. Each apex portion of the rotor has means for sealing being radially movable and urged into engagement with the peripheral wall. Patent No. 3,033,180 issued May 8, 1962, discloses sealing means for such a rotary mechanism.

In general, the invention is directed to a rotary engine configuration in which the inner body has a plurality of seals circumferentially spaced about its external periphery. These seals are engageable with the inner surface of the outer body peripheral wall. The centrifugal forces of these seals are variable both in sense and magnitude. In the rotary engine of the above-mentioned patent, the multi-lobed profile of the peripheral wall has alternate concave and convex portions. As more fully explained hereinafter, as the rotor rotates relative to the outer body, the centrifugal forces of each apex seal of the rotor are alternately directed inwardly and outwardly relative to the rotor.

With respect to the outwardly directed centrifugal force, as rotor speeds are increased the force of the apex seal against the peripheral wall increases. Such centrifugal force, if excessive, causes undue frictional wear of the peripheral wall and apex seals, and decreases overall engine efficiency.

An object of the invention is to provide novel means to compensate for the variable effects of centrifugal forces of the apex seals of the rotor.

A further object of the invention is to provide means to prevent excessive frictional wear of apex seals and the peripheral wall.

Still another object of the invention is to increase the efficiency of rotary combustion engines.

SUMMARY

A rotary combustion engine has a housing defining an internal cavity, the peripheral wall of the housing having an inner surface with a basically epitrochoidal profile as viewed in the axial direction. Disposed in the cavity is a rotor having a plurality of apexes which sweep the peripheral wall in sealing relation, the rotor and the housing defining therebetween a plurality of working chambers which vary in volume on relative rotation of the rotor and housing.

Sealing therebetween is achieved by providing in each rotor apex a slot extending in a direction parallel to the axis, with a radially movable seal strip positioned within the slot and spring-loaded to maintain contact with the peripheral wall. In a multilobed epitrochoid there are reversals of curvature. In a two-lobed epitrochoid such as that shown in the accompanying drawings, there are two concave curved portions and two convex portions, as viewed from inside the housing. Consequently, as the seal strips trace the epitrochoidal path they are subjected to reversals of centrifugal and centripetal forces, tending to move radially in the outward direction in the concave portions and inwardly in the convex portions.

The spring loading of the seal strips and the effect of gas pressure in the slots under the seals are sufficient to hold the seal strips in sealing contact while traversing the convex curved portions, and although there is an additional centrifugal effect in the concave portions this is relatively unimportant at low engine speeds, with respect to wear and friction. Good sealing is required for satisfactory starting and smooth running at low engine speeds.

However, at high engine speeds, not only is the centrifugally outward effect of the seals in the concave portions greatly increased, with concomitant increase of contact pressure, but also the rubbing speed itself is a cause of increased friction. With such greatly increased friction there is a loss of power, and accelerated wear of the housing and the seal strips. Further, at high engine speeds perfect sealing is no longer required, since gas leakage past the rotor apexes is largely a function of time. Therefore, it would be an advantage to diminish the contact pressure of the seal strips against the peripheral wall at high speeds, or even to relieve it altogether.

The present invention provides in a cavity within the rotor an inertia device and lever system linked with each of the seal strips, and responsive to the same centripetal and centrifugal forces as those affecting the seal strips, and also to frictional forces between the inertia device and the interior of the rotor. The rotor is provided with an annular channel in which is disposed a "floating" ring having a link to each apex seal. The channel is concentric with the rotor and therefore with the eccentric on which the rotor is journaled. The ring responds to the crankthrow of the eccentric which brings it into contact with the channel wall, whereupon friction with the wall causes the ring to rotate slightly and pull upon the links, which draw the apex seals inwardly. The seal springs biasing the seal strips outwardly have a spring force sufficient that at low engine speeds they will hold the ring centered and the seals will not be drawn inwardly below a predetermined speed.

DESCRIPTION OF THE PREFERRED EMBODIMENT

The invention is illustrated and described in connection with a particular type of rotary internal combustion engine. It will be obvious, however, that the invention is also applicable to other rotary mechanisms and to rotary mechanisms for use as fluid pumps and fluid motors.

Figure 1:
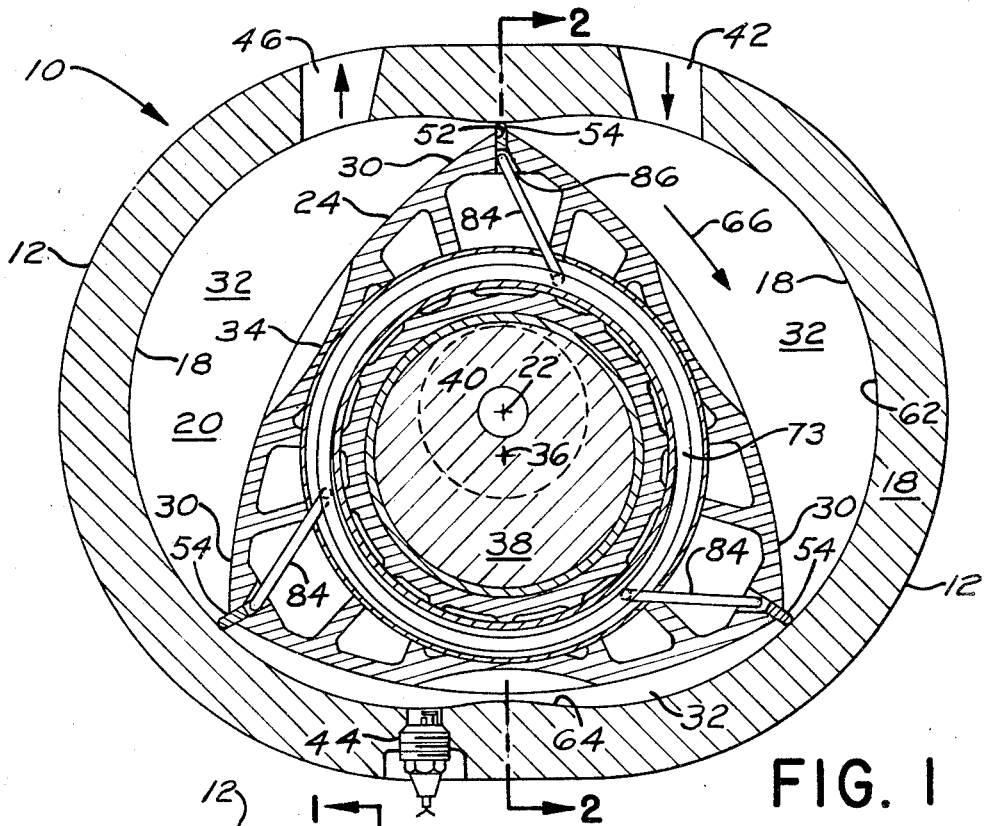
FIG. 1 is a cross-section of a rotary engine looking in the axial direction, taken on line 1—1 of FIG. 2.
Figure 2:
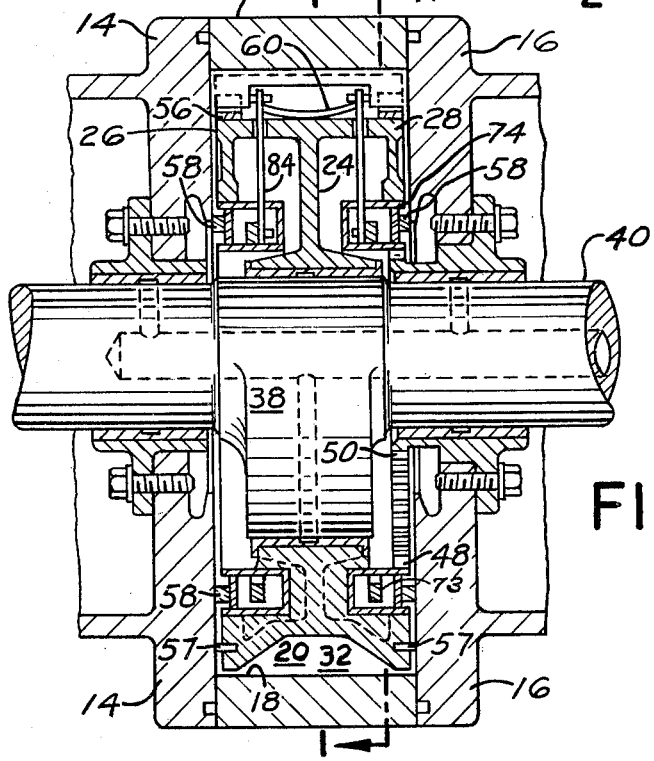
FIG. 2 is a cross-section taken on line 2—2 of FIG. 1.

Referring first to FIGS. 1 and 2 of the drawing, a rotary internal combustion engine is generally indicated by the reference numeral 10. The engine 10 comprises an outer body 12 having axially-spaced end walls 14 and 16 and a peripheral wall 18 connected therebetween to form a cavity 20. As viewed in a plane transverse to the axis 22 of the cavity 20 (indicated in FIG. 1), the multi-lobed profile of the cavity 20, in the preferred form, is basically an epitrochoid. As illustrated herein, the cavity profile as two lobes. However, as will appear, the invention is not limited to a rotary engine having this specific arrangement.

An inner body or rotor 24 is disposed within the cavity 20 of the outer body 12. The rotor 24 has axially spaced end faces 26 and 28 disposed adjacent to and in sealing cooperation with the end walls 14 and 16. In addition, the rotor 24 has a plurality of circumferentially-spaced apex portions 30 which preferably are one more in number than the number of lobes of the cavity 20. Thus, as illustrated, the cavity 20 has two lobes and rotor 24 has three apex portions 30. The outer periphery of the rotor 24 has a generally triangular profile. The apex portions 30 are in sealing engagement with the inner surface of the peripheral wall 18 to form a plurality of working chambers 32 (three are shown) between the rotor 24 and the outer body 12.

Each working chamber 32 includes a trough or channel 34 in the adjacent peripheral or working face of the rotor 24, for transfer of gases across the cusp of the epitrochoid. The geometrical axis 36 of the rotor 24 is offset from and is disposed parallel to the cavity axis 22.

In the engine 10 illustrated, the outer body 12 is stationary while the rotor 24 is journaled on an eccentric portion 38 of a shaft 40. The axis of the shaft 40 is coaxial with the cavity axis 22. (The cavity axis 22 is hereinafter referred to as the shaft axis.) Upon rotation of the rotor 24, relative to the outer body 12, the working chambers 32 vary in volume. An intake port 42 is provided in the peripheral wall 18 for admitting air and fuel into the working chambers 32; the intake port may also be located in one or both side walls. A spark plug 44 is provided for igniting the combustion mixture. An exhaust port 46 is provided in the peripheral wall 18 for discharge of exhaust gases from the working chambers 32. As shown in FIG. 1, the rotor 24 turns clockwise in the direction of the arrow 66.

The working chambers 32 have a cycle of operation including the four phases of intake, compression, expansion, and exhaust. The phases are similar to the four-stroke cycle of a reciprocating-type internal combustion engine. It is again emphasized that, although the preferred embodiment disclosed herein is an epitrochoidal rotary engine, the invention is not limited to this specific type of rotary mechanism.

In order to maintain the position of the rotor 24 relative to the outer body 12, an internal ring gear 48 is coaxially secured to the rotor 24. The ring gear 48 is disposed in meshing engagement with a fixed pinion gear 50 secured to the end wall 16. The pinion gear 50 is coaxial with the shaft 40. In the embodiment illustrated, the meshed pinion and ring gears 48 and 50, respectively, have a gear ratio of 2 to 3.

For efficient engine operation, the working chambers 32 should be sealed. For this purpose a groove or slot 52 extends radially inwardly from each apex of the rotor 24 and runs from one end face 26 to the other end face 28, parallel to the rotor axis 36. An apex seal 54 is in each groove or slot 52 and is in sealing engagement with the inner surface of the peripheral wall 18. As illustrated, each apex seal 54 comprises a single strip of metal which extends to both end walls 14 and 16 and is in sealing engagement with the peripheral and end walls 18, 14, and 16, respectively. The invention, as disclosed herein, is not limited to this particular type of apex seal structure and may be applied to variations thereof. One such structure is shown in copending application, Ser. No. 575,481, filed July 21, 1966.

Each apex slot 52 has a cylindrically-shaped enlarged portion at each end disposed radially inwardly of its outer edge. Within the enlarged portion are apex seal pins 56 (shown in sectional view in FIG. 2). Each apex seal pin 56 has a slot in register with rotor slot 52 for receiving the radilly inner edge of the adjacent end of an apex seal 54.

Each rotor end face 26 and 28 has a plurality of end face seal strips 57 (shown in FIG. 2). Each of these seal strips 57 extends between a pair of adjacent seal pins 56 and cooperates with the apex seal pins 56 to provide a continuous gas seal between the end faces 26 or 28 and the end wall 14 or 16, adjacent thereto. Also, each end face 26 and 28 preferably has an oil seal arrangement 58 (shown in FIG. 2) disposed adjacent to its inner periphery The apex seals 54, the apex seal pins 56, and the end face seal strips 57 cooperate to form a continuous seal around each working chamber 32 between the rotor 24 and the outer body 12.

The apex seals 54 are not rigidly retained within the rotor 24. Instead each apex seal 54 is radially movable into and out of its slot 52 in order to maintain contact with the peripheral wall 18 notwithstanding the presence of bearing clearance, thermal distortions, and other inaccuracies. In addition, the seal slot 52 is slightly wider than the seal to permit lateral freedom of the seal. A suitable spring 60 may be provided in the slot under each apex seal 54 for urging it radially outwardly to insure contact with the peripheral wall 18.

The multi-lobed inner surface of the peripheral wall 18 has circuferentially-spaced concave portions or lobes 62 interconnected by circumferentially-spaced convex surface portions 64. As an apex seal 54 moves along a concave surface portion 62, it tends to move outwardly into contact with the peripheral wall 18. When, however, the apex seal 54 moves along a convex surface portion 64, it tends to move inwardly out of contact with the peripheral wall 18. This tendency to change the direction of the radial movement is a result of changes in the direction of the centripetal and centrifugal forces acting on these apex seals 54. These seal forces are generated as a result of the rotational path each apex seal 54 is forced to travel as a result of being confined in a slot 52 at a rotor apex portion 30. Hence, each apex seal 54 is forced to travel along the epitrochoidal path substantially defined by the peripheral wall 18 subject, however, to limited radial movement as permitted within its apex slot 52.

Figure 3:
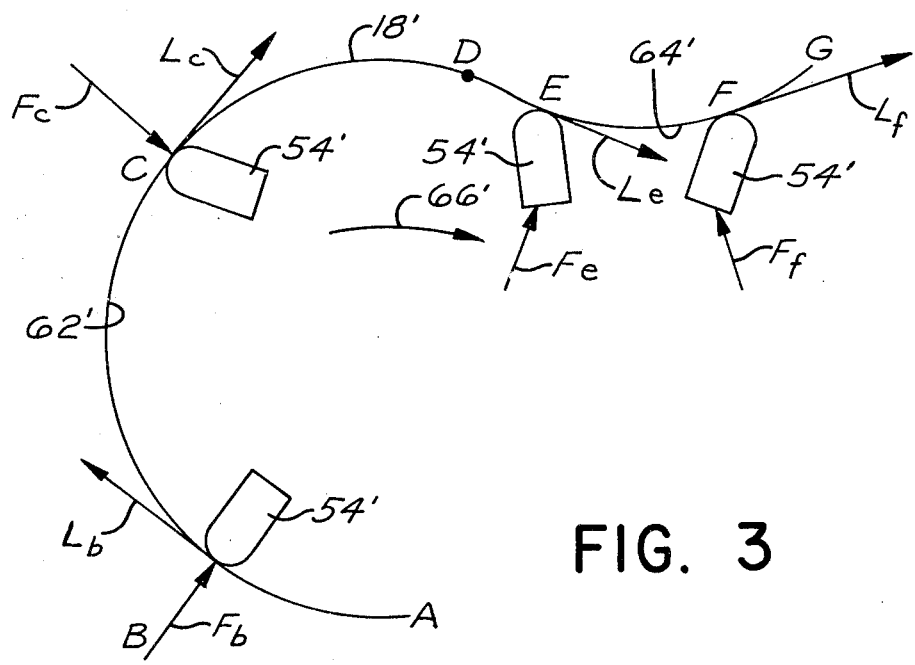
FIGS. 3 and 4 are schematic representations of a body tracing an epitrochoidal path.
Figure 4:
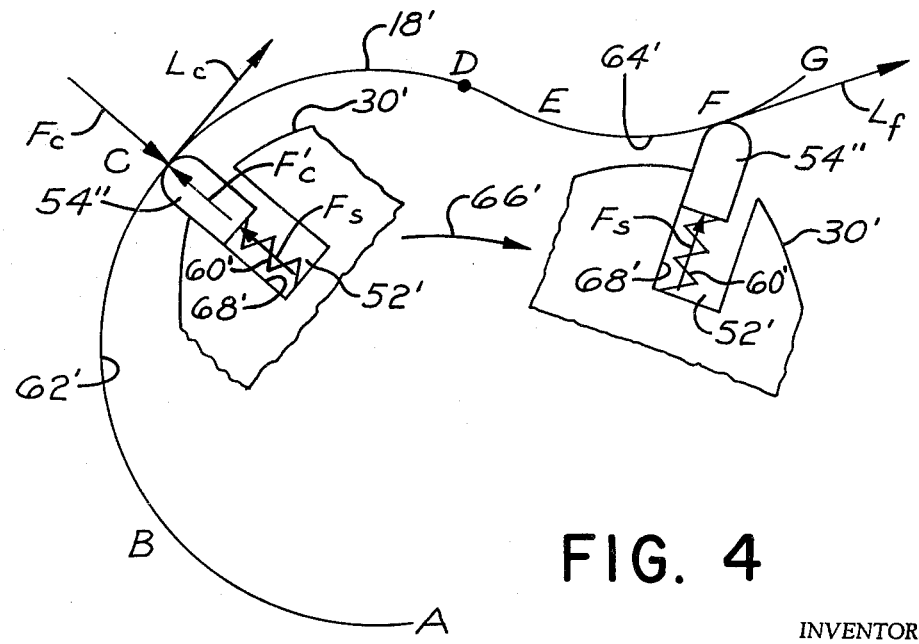

To more clearly describe the nature of the radial forces acting on the seals, the following discussion is made in connection with the schematic views of FIGS. 3 and 4.

In discussing the effect of forces upon a body, it is customary to consider that body as removed from all surrounding constraints. Each constraint is replaced by a force indicating its effect on that body. The resulting body is known as a "free body"; the study of forces with respect to that body is known as a "free body analysis." It is well known that a free body analysis can be made of a mechanical body. In this manner, a free body analysis can be made, for example, of a rotor or any part carried by the rotor, such as the apex seals. In the following discussion, a free body analysis is made of the apex seals 54 carried by the rotor 24. Primed reference numerals are used in FIGS. 3 and 4 to indicate parts which are similar to parts of the rotary engine 10 of FIGS. 1 and 2.

Newton's First Law of Motion states that: A body at rest remains at rest, and a body in motion continues to move at constant speed along a straight line, unless there is a resultant force acting upon the body.

A body moving in a curved path is accelerated because its velocity is changing continually in direction, even though the body travels at a constant speed. This change is one of direction or sense and not magnitude. Thus, if the path is continually changing in direction, additions are continually being made to it even though the magnitude of the velocity remains the same.

If a body is to proceed from one point to another point on a curved path, maintaining the same magnitude of velocity at both points, an added force will be required. An acceleration is associated with and has the same sense as the added force. The sense of this added velocity and acceleration is toward the center of curvature of the path.

The acceleration toward the center of curvature of the path is called "centripetal acceleration." It is well known that force is equal to mass times the acceleration. Thus, a force can be assumed to be acting upon the body; this force is also directed toward the center of curvature and is called "centripetal force."

Since for any action there is an equal and opposite reaction (Newton's Third Law of Motion), the moving body exerts an equal and opposite force upon the constraining agent in a direction radially away from the center of curvature. This reaction to the centripetal force is called "centrifugal force." Said in other words, when a body moves in a curved path, the force upon that body acting in a direction toward the center of curvature of that path is called "centripetal force"; the force applied by the body in reaction to the centripetal force, is termed "centrifugal force."

There is shown in FIGS. 3 (and 4), a free body 54' (54"), which can be of any shape (shown in the general shape of an apex seal 54), traveling along a curved path from point A toward point G in the direction of arrows 66'. The curved path A–G is in the form of a compound curve (similar to the profile of the peripheral wall 18 shown in FIG. 1) in which the direction of curvature reverses at an inflection point D. The free body 54' is shown in FIG. 3 at four typical positions along this curve A–G, namely at points B, C, E, and F.

An arrow Lb is a straight line tangent to the curved path at point B and indicates the instantaneous direction of travel of the free body 54'. If the free body 54' is to travel along the curved path A–G from point B, rather than in the direction of the arrow Lb, a centripetal force must be applied to it. This force, represented by the arrow Fb, provides the free body 54' with an inward component of motion toward the instantaneous center of curvature of the path at point B.

In the same manner, the arrow Lc is a straight line tangent to the curve and indicates the instantaneous direction of travel of the body 54' at point C. If the free body 54' is to travel along the curved path A–G from point C, rather than in the direction of arrow Lc, a centripetal force must be applied to provide the free body 54' with an inward motion toward the instantaneous center of curvature of the curved path at point C.

Thus, a force directed toward the instantaneous center of curvature must be applied to constrain the free body 54' to follow the curved path A–G instead of following a straight line tangent to the path A–D.

Consider now the situation at the point E. Point E is just beyond the point of inflection D on the path A–G. The arrow Le is a straight line tangent to the curve at point E and indicates the instantaneous direction of travel of the free body 54'. Once again, if the free body 54' is to travel along the curved path A–G to G from point E. rather than in the direction of the arrow Le, a centripetal force, represented by the arrow Fe, must be applied. This force Fe provides a component of motion directed inwardly toward the instantaneous center of curvature of the curved path A–G at point E. It should be noted that the curvature of the path A–G reverses beyond the inflection point D. Therefore, the instantaneous centers of the path portion D–G are on an opposite side from the instantaneous centers of the portion A–D of the path A–G.

At point F, the situation is substantially the same as at point E. The arrow Lf is a straight line tangent to the curve and indicates the instantaneous direction of travel of the free body 54' at point E. If the free body 54' is to travel along the curved path A–G, rather than in the direction of the arrow Lf, a centripetal force represented by the arrow Lf, must be applied to the body 54' to provide an inward motion toward the instantaneous center of curvature of the curved path at point F.

As the body 54' passes along the path A–G, it tends to travel in a straight line tangnet to the curved path at any instantaneous point. In order that the body 54' be constrained to travel along the curved path A–G, a centripetal force must be applied at each instantaneous point. Since, as has been previously explained, the direction of the required centripetal force is always towards the instantaneous center of curvature of the compound curved path A–G of travel of the free body 54', and since the instantaneous centers will be found first on one side and then on the other side of the path A–G, then the direction of the centripetal forces constraining the moving free body 54' must reverse as the body travels past the inflection point D.

As explained above, centrifugal force is a reactiton force of a body, equal and opposite to the centripetal force upon it; therefore, it follows that, if the centripetal force upon the free body 54' reverses direction as the free body 54' travels past the inflectiton point D, the centrifugal force of that free body 54' must reverse as well.

Both FIGS. 3 and 4 show the compound curve A–G (substantially in the form of a portion of the profile of the epitrochoidal surface of the peripheral wall 18 of FIG. 1). For simplicity in FIG. 4 a seal body 54" (the free body 54' of FIG. 3) is shown only at points C and F. This seal body 54" is illustrated as being within a slot 52' of an apex portion 30' of a rotor 24'.

For purposes of the discussion, the apex seals 54" of FIG. 4 are assumed to be being pushed by a side wall 68' of the slot 52' at a constant linear speed along the compound curved surface A–G of a peripheral wall 18'. In common practice, however, the apex seals 54, due to the motion of the rotor 24, will move at varying speeds. Such changes will not vary the sense of the forces being discussed herein. As indicated above with reference to FIG. 3, the sense of the centripetal forces will be directed toward the instantaneous center of curvature. For example, at point C, in the absence of a peripheral wall 18' of an outer body (and neglecting friction between the seal body 54" and the walls of the slot 52'), the seal body 54", pushed by the rotor 24', would travel in a straight line in the direction of the arrow Lc. The peripheral wall 18', however, prevents the seal body 54" from traveling in such a direction. The wall 18' forces or constrains the seal body 54" to travel along the curved path A–G. Thus, at point C, as well as at each instantaneous point along the portion of the curved path A–D, the centripetal forces of the peripheral wall 18' constrain the seal body 54". The equal and opposite centrifugal force to the centripetal force is shown in FIG. 4 by the arrow F'c.

Similarly, at point F the seal body 54", in the absence of a centripetal force, would travel along a straight line in the direction of the arrow Lf. As shown in FIG. 3, a centripetal force at point F (arrow Ff shown in FIG. 3) is directed toward the instantaneous center of curvature and outwardly relative to the rotor axis 36 and shaft axis 22 (shown in FIG. 1).

The peripheral wall 18' cannot provide an outward centripetal force on the seal body 54". To provide the outward centripetal force, a spring 60' (which can be assumed to include the effect of any gas pressure) is provided between the seal body 54" and the bottom wall 70' with the side walls of the groove 52'. The spring 60' is designed to exert an outward force (arrow Fs) on the seal body 54" which is sufficient in magnitude to provide the centripetal force necessary to force the seal to travel along the convex paths at the point F and in addition to insure adequate contact pressure between the seal body 54" and the peripheral wall 18' in all positions of the seal body 54" along its path of travel.

Neglecting any friction between the seal body 54" and the side wall 68' of the slot 52', the contact pressure at point F is equal to the difference between the force Fs, exerted by the spring 60' on the seal body 54", and the centrifugal reaction force occurring at point F. This relationship will hold at each point along the convex portion 64' of the peripheral wall 18'. At every other point, such as the concave portion 62 of the peripheral wall 18', however, the spring force and the centrifugal force (arrows Fs and F'c, respectively) will both act in the same direction, urging the seal against the epitrochoidal inner surface 18'.

The contact pressure force of the seal body 54" against the curved surface A–G of the peripheral wall 18' at point C is equal to the sum of the spring force Fs and the centrifugal force F'c. Therefore, along the concave portions 62' the seal contact pressure against the peripheral wall 18' is greater than the contact pressure at the convex portions 64'. Accordingly, if the contact pressure of the seal member 54" is adequate at a point on the convex portion 64', such as at point F, it may become excessive at points on the concave portion 62', such as point C.

Gas leakage past seals is a function of time. As the rotational rate increases, there is less time for gases to escape from the working chambers. Therefore, as the rate of rotation is increased, the necessity for close-sealing engagement between the apex seals 54 and the peripheral wall 18 diminishes. Sealing contact, useful at low speeds, will introduce at high speeds undesirable housing and seal wear and increase a loss of power due to friction.

This invention overcomes these limitations by providing inertia devices responsive to the same centrifugal and centripetal forces to which the seals are subject, and so constructed as to exert a restraining force on the seals to reduce or relieve their contact pressure against the peripheral wall. The device is depicted installed in the engine in FIGS. 1, 2, and 5.

Each of the axial end faces 26 and 28 of the rotor has inserted therein an annular channel member 74 coaxial with the rotor axis 36, the channel having a radially inner wall 72 and a radially outer wall 75, and with the open side of the channel section facing axially outward. The oil seal arrangements 58 are disposed in this channel.

Axially inward from the oil seal there is positioned in each annular channel 74 a ring 73 which would be "free-floating" within the channel except for its linkage with the seal strips as hereinafter described. The dimensions of the ring in this embodiment are so chosen with respect to the diameters of inner and outer channel walls 72 and 75 that when the ring moves about in the channel it cannot come into contact with outer channel wall 75. In other words, the inner diameter of ring 73 is slightly larger than the diameter of inner channel wall 72, and even when the ring moves so that its inner diameter is tangent to wall 72 the outer diameter is not large enough to touch wall 75. The actual disparity between the inner diameter of the ring and the diameter of wall 72 is only a few thousandths of an inch, but the dimensions have been exaggerated in the drawings for clarity of illustration.

The outer channel wall 75 has a plurality of apertures 76 therethrough, each aperture pointing generally toward an associated apex seal but not positioned in direct radial line therewith. In the embodiment of FIG. 1, apertures 76 are positioned somewhat ahead of the seal position, that is, in the leading direction with respect to the direction of rotor rotation shown by arrow 66. In the embodiment to be described in connection with FIG. 7 the apertures 76 are located in the direction trailing the apex seals.

Figure 5:
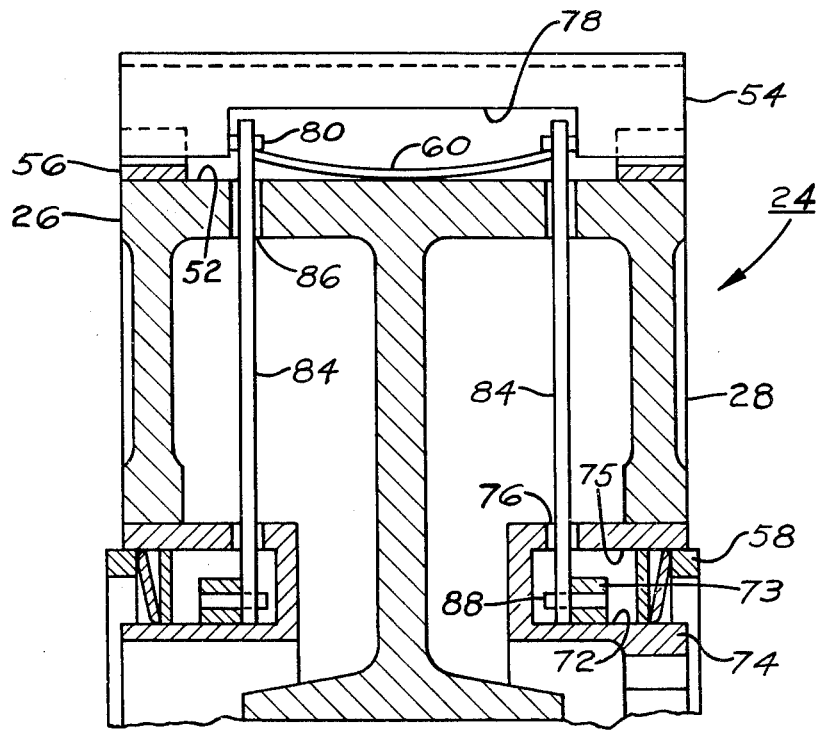
FIG. 5 is an enlarged view of the upper portion of FIG. 2.

The apex seal strips 54 have a rectangular recess 78 cut into the radially inner edge of the seal between the ends (shown in FIG. 5). A pin or boss 80 projects axially inwardly from that portion of the edge of the seal defining the end of recess 78. Directly in line with each of the pins 80 there is an aperture 86 through the bottom of the seal slot 52 communicating with the interior of the rotor at the same axial depth therein as apertures 76 in the annular channel. A link member 84 extends through each slot aperture 86 and through the associated channel aperture 76. The links are pivotally mounted at their radially outer ends on pins 80 and at their radially inner ends on pins 88 which extend axially from one face of ring 73. The seal pins 80 also serve to engage the seal springs 60 in slots 52, which springs bias the seal strips in the radially outward direction.

Figure 6:
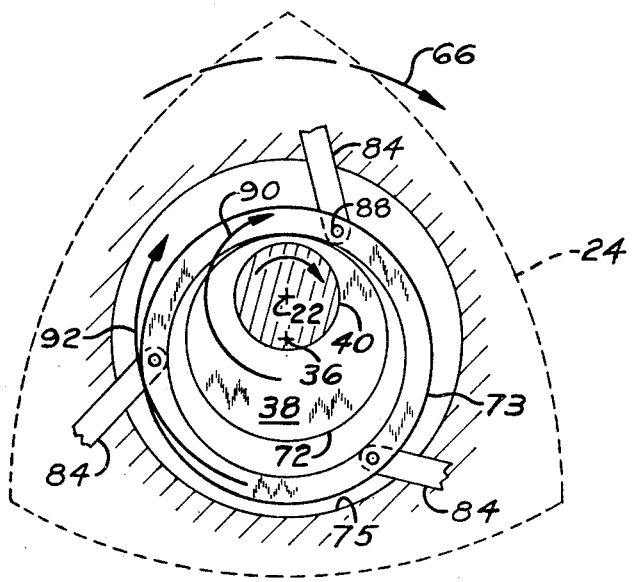
FIG. 6 is a semischematic representation of the operating principle of the invention.

The operation of the inertia device will be understood from a description of FIG. 6, wherein the system is semi-schematically shown as if the engine were running, with the rotor turning clockwise in the direction of arrow 66. The shaft 40, of course, rotates in the same direction about its axis 22. The eccentric 38 is being swung in a crank motion as shown by arrow 90, the axis 36 of the eccentric being the center of mass of the rotor and all its associated parts, including the annular channel 74 of which only the inner and outer walls 72 and 75 are schematically shown in FIG. 6. Although the rotor itself is turning about the axis 36 of the eccentric at a different rate than the shaft speed, such rotation has no effect on the inertia device, which is itself part of the rotor and has the same center of mass.

When the rotor is at rest the ring 73 is centered by the seal springs 60 so that the center of mass of the ring is also on axis 36. However, when the shaft is turning at a rate higher than the preselected speed, the ring 73 which is resiliently floating within the annular channel is centrifugally thrown toward the position shown in FIG. 6. When the inner diameter of the ring comes into contact with wall 72, as shown at the top portion of the figure, there is a tendency from its frictional engagement with the wall for the ring to creep or roll around the eccentric in the clockwise direction shown by arrow 92, rather in the manner of spinning a hoop around a finger. The links 84 follow this clockwise rotation of the ring and pull inwardly on the apex seals. At intermediate speeds the spring force of the seal springs 60 resists this pull sufficiently that the seals may remain in contact with the peripheral wall, although their contact pressure is diminished. At higher speeds the seals will be retracted entirely from sealing contact, the ultimate limit of such retraction being the bottoming of the seals within their slots.

It is emphasized that the centrifugal effect on rings 74 is due only to shaft rotation, and that the inertia device is not subject to any effect from the varying apex speed of the rotor nor to any effect from the reversal of curvature of the epitrochoid. The speed of the shaft is constant, and even though any individual seal traversing a given curvature of the epitrochoid might be thought to exert an influence on the ring, there is always an opposite balancing effect on such a seal by the other seals traversing other curvatures. Hence, the retractile effect on all seals is the same.

Figure 7:
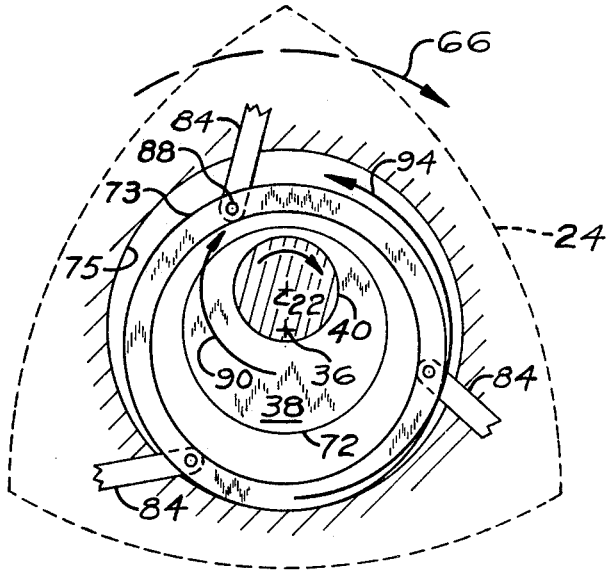
FIG. 7 is a semischematic of another embodiment of the invention.

In FIG. 7 there is shown a modified embodiment in which the dimensions of ring 73 are chosen such that the outer diameter of the ring will come into contact with the outer wall 75 of the annular channel, and the inner diameter of the ring cannot come into contact with inner channel wall 72. In this embodiment the direction of rotation of the shaft, eccentric, and rotor are the same as those previously described, and the ring is subject to the same centrifugal forces.

In this case, however, the ring creeps in the opposite direction, counter-clockwise as shown by arrow 94, owing to its frictional engagement with the outer wall of the channel. In this respect its motion is somewhat similar to that of a spur gear traveling around inside an internal gear, the ring 73 being analogous to the spur gear and the outer wall 75 corresponding to the internal gear. The amount of creeping motion possible is small, as in the previous embodiment, being limited by the ultimate bottoming of the seals. It will be observed in FIG. 7 that the links 84 slant in the other direction, since the seals in this embodiment are leading the links, and the apertures 76 in wall 75 as well as slot apertures 86 must be appropriately positioned.

What is claimed is:

1. In a rotary combustion engine of the type having an outer body having spaced end walls and a peripheral wall defining an internal cavity having a central axis, a shaft transpiercing the end walls on the central axis and having an eccentric portion within the cavity having mounted thereon a rotor for rotation with respect to the outer body about the eccentric axis which planetates about the shaft axis, the profiles of the rotor and the peripheral wall defining therebetween a plurality of variable-volume working chambers, the rotor having a plurality of axially-extending slots with a radially movable seal strip positioned in each slot for sealing against the peripheral wall, means for reducing the contact pressure of the seal strips against the peripheral wall comprising:
   (a) inertia means carried by the rotor for restraining radially outward movement of the seal strips and for retracting the seal strips from contact with the peripheral wall, including:
      (i) at least one movable mass carried by the rotor and responsive to centrifugal forces generated by shaft rotation,
      (ii) link means connecting the movable mass and each seal strip,
      (iii) friction means carried by the rotor and engaging the movable mass at a predetermined engine speed to exert retractile force on the links.

2. The combination recited in claim 1, wherein the rotor has an annular channel coaxial with the eccentric, the movable mass is a ring disposed within the channel and having a rest position substantially coaxial with the eccentric, and the friction means is one of the channel walls.

3. The combination recited in claim 2, wherein the friction means is the radially inner channel wall and the inner diameter of the ring is centrifugally urged into contact therewith by shaft rotation, and by frictional engagement with the inner channel wall the ring is urged to rotate within the channel in the direction of shaft rotation to exert retractile force on the links.

4. The combination recited in claim 3, wherein the radially outer ends of the links are pivotally connected to the seal strips and the radially inner ends of the links are pivotally attached to the ring, at the rest position of the inertia device the inner ends of the links being somewhat advanced circumferentially in the leading direction with respect to shaft rotation.

5. The combination recited in claim 4, wherein each of the seal strips has resilient means urging it radially outwardly, the combined effect of the resilient means tending to restrain the ring in a position substantially coaxial with the eccentric and being of sufficient strength to hold the ring out of contact with the channel wall below a predetermined engine speed.

6. The combination recited in claim 5, wherein the rotor bears a plurality of inertia devices.

7. The combination recited in claim 2, wherein the friction means is the radially outer wall of the channel and the outer diameter of the ring is centrifugally urged into contact therewith by shaft rotation, and by frictional engagement with the outer channel wall the ring is urged to rotate within the channel in the direction opposite to the direction of shaft rotation to exert retractile force on the links.

8. The combination recited in claim 7, wherein the radially outer ends of the links are pivotally connected to the seal strips and the radially inner ends of the links are pivotally attached to the ring, at the rest position of the inertia device the inner ends of the links being somewhat retarded circumferentially with respect to the direction of shaft rotation.

9. The combination recited in claim 8, wherein each of the seal strips has resilient means urging it radially outwardly, the combined effect of the resilient means tending to restrain the ring in a position substantially coaxial with the eccentric and being of sufficient strength to hold the ring out of contact with the channel wall below a predetermined engine speed.

10. The combination recited in claim 9, wherein the rotor bears a plurality of inertia devices.

References Cited

UNITED STATES PATENTS

| | | | |
|---|---|---|---|
| 3,118,595 | 1/1964 | Fuhrmann | 123—855 |
| 3,229,673 | 1/1966 | Ehrhardt | 230—145 |

C. J. HUSAR, Primary Examiner

U.S. Cl. X.R.

230—145